United States Patent
Kyllonen

[15] 3,707,208
[45] Dec. 26, 1972

[54] SLACK ADJUSTER MECHANISM FOR TREAD BRAKE APPARATUS

[72] Inventor: Allen W. Kyllonen, Pittsburgh, Pa.
[73] Assignee: Westinghouse Air Brake Company, Wilmerding, Pa.
[22] Filed: July 19, 1971
[21] Appl. No.: 163,937

[52] U.S. Cl. ............................188/202, 188/196 BA
[51] Int. Cl.................................................F16d 65/56
[58] Field of Search ..........188/52, 196 BA, 202, 203

[56] References Cited

UNITED STATES PATENTS

| | | | |
|---|---|---|---|
| 2,940,553 | 6/1960 | Newell et al............................ | 188/202 |
| 2,940,554 | 6/1960 | Cameron...................... | 188/196 BA X |

Primary Examiner—Duane A. Reger
Attorney—Ralph W. McIntire, Jr.

[57] ABSTRACT

This invention relates to a slack adjuster mechanism for a tread brake apparatus used for braking a railway car wheel. A fluid pressure operated piston transmits a braking force to a brake shoe through an actuating lever and a brake rod which comprises a screw and a nut about which is disposed a slack adjuster mechanism that embodies a ratchet secured to the nut and a pawl that is operated by a linkage that includes a bell-crank lever that is pivotally mounted at the junction of its arcuate-shaped arm and bifurcated arm on a slack adjuster stem driver carried by an operating stem that constitutes one member of this linkage. The arcuate-shaped arm of the bell-crank lever abuts a roller carried by a stationary bracket, and one end of the bifurcated arm carries a roller that abuts a stop formed on a slack adjuster ring disposed in surrounding relation to the brake rod and anchored to the brake actuating lever to be movable therewith so that this movable stop constitutes a fulcrum about which the bell-crank lever is rocked as the bracket roller rolls along the arcuate surface of the arcuate-shaped arm when a brake application is effected to cause downward movement of the junction of the lever arms thereby, via the stem driver, the operating stem, which extends through the bifurcated arm, and other members of the linkage actuating the pawl and ratchet to take up slack upon effecting a brake release if the shoe clearance is excessive.

10 Claims, 4 Drawing Figures

PATENTED DEC 26 1972

INVENTOR.
ALLEN W. KYLLONEN

BY Ralph W. McIntire, Jr.

ATTORNEY

INVENTOR.
ALLEN W. KYLLONEN
ATTORNEY

SLACK ADJUSTER MECHANISM FOR TREAD BRAKE APPARATUS

BACKGROUND OF THE INVENTION

Certain heretofore-known tread brake apparatus, when used to provide the braking force on the corresponding wheels of a railway passenger car, or a rapid transit car, are often mounted on a sprung part of the car such as, for example, a truck frame which is supported on springs that rest on equalizers that are supported on the truck journal boxes. Consequently, as the load on the car increases with the number of passengers boarding the car, these tread brake assemblies are moved downward relative to the corresponding car wheels thereby increasing the normal clearance between the brake shoe of each respective brake assembly and the tread surface of its corresponding wheel under brake release conditions.

The slack adjuster mechanism in these heretofore-known apparatus is operated by a lug carried on the brake operating lever. While the brakes are released and prior to any brake shoe wear, this lug is spaced a certain distance away from the slack adjuster mechanism which distance corresponds to a certain brake shoe clearance. Upon the occurrence of any subsequent brake shoe wear, the slack adjuster mechanism operates to maintain this certain brake shoe clearance. As the brake shoe and/or wheel wear away, the angularity of the brake rod is correspondingly changed in response to the bail action of the brake head hanger. Since the slack adjuster mechanism is carried by the brake rod, any change in angularity of the brake rod effects a corresponding change in the distance between the slack adjuster mechanism and the lug. As this distance changes, it causes the slack adjuster mechanism to maintain a brake shoe clearance that is greater or less than nominal shoe clearance. Adding this greater or less shoe clearance to the variation in shoe clearance caused by the vertical movement of the car truck relative to the car wheels as the load on the car changes, an undesirable brake shoe clearance may be obtained.

Accordingly, it is the general purpose of this invention to provide a slack adjuster mechanism for a tread brake apparatus that is always operative to compensate for changes in the angularity of the brake rod as a result of brake shoe and/or wheel wear to maintain a substantially constant brake shoe clearance throughout the wear life of both the wheel and brake shoe.

SUMMARY OF THE INVENTION

According to the present invention, a novel slack adjuster mechanism is provided for a tread brake apparatus that includes a brake rod embodying a screw-threaded member on which is rotatively mounted a ratchet-carrying nut member. A pawl for effecting rotation of the ratchet upon effecting a brake release subsequent to the occurrence of a certain chosen degree of brake shoe wear is pivotally carried at one end of a lever rockable about a fulcrum intermediate its ends by an operating stem that is pivotally connected to the other end of this lever. The operating stem carries a stem driver upon which a bell-crank lever is pivotally mounted at the junction of its two arms. One arm is arcuate-shaped and is movable relative to a first roller carried by a stationary bracket. The other arm is bifurcated for straddling the operating stem and carries at its outer end a second roller that abuts a flat surface formed on a slotted slack adjuster ring disposed about and on the opposite sides of the ratchet. This ring is anchored to the brake rod actuating lever and, therefore, movable therewith so that the flat surface thereon constitutes a fulcrum for the second roller as it rolls therealong. Consequently, when a brake application is effected, the bell-crank lever is rocked about the second roller as a fulcrum to transmit a force via the junction of its arms to the stem driver on which it is pivotally mounted. Since the stem driver is carried on the linkage operating stem, a force is therefore transmitted to the linkage to move the pawl relative to the ratchet, this movement of the pawl increasing with brake shoe wear. Consequently, upon effecting a brake release subsequent to a chosen amount of brake shoe wear, the pawl is effective to rotate the ratchet-carrying nut member relative to the screw-threaded member thereby increasing the length of the brake rod to compensate for brake shoe wear.

Figure 1:
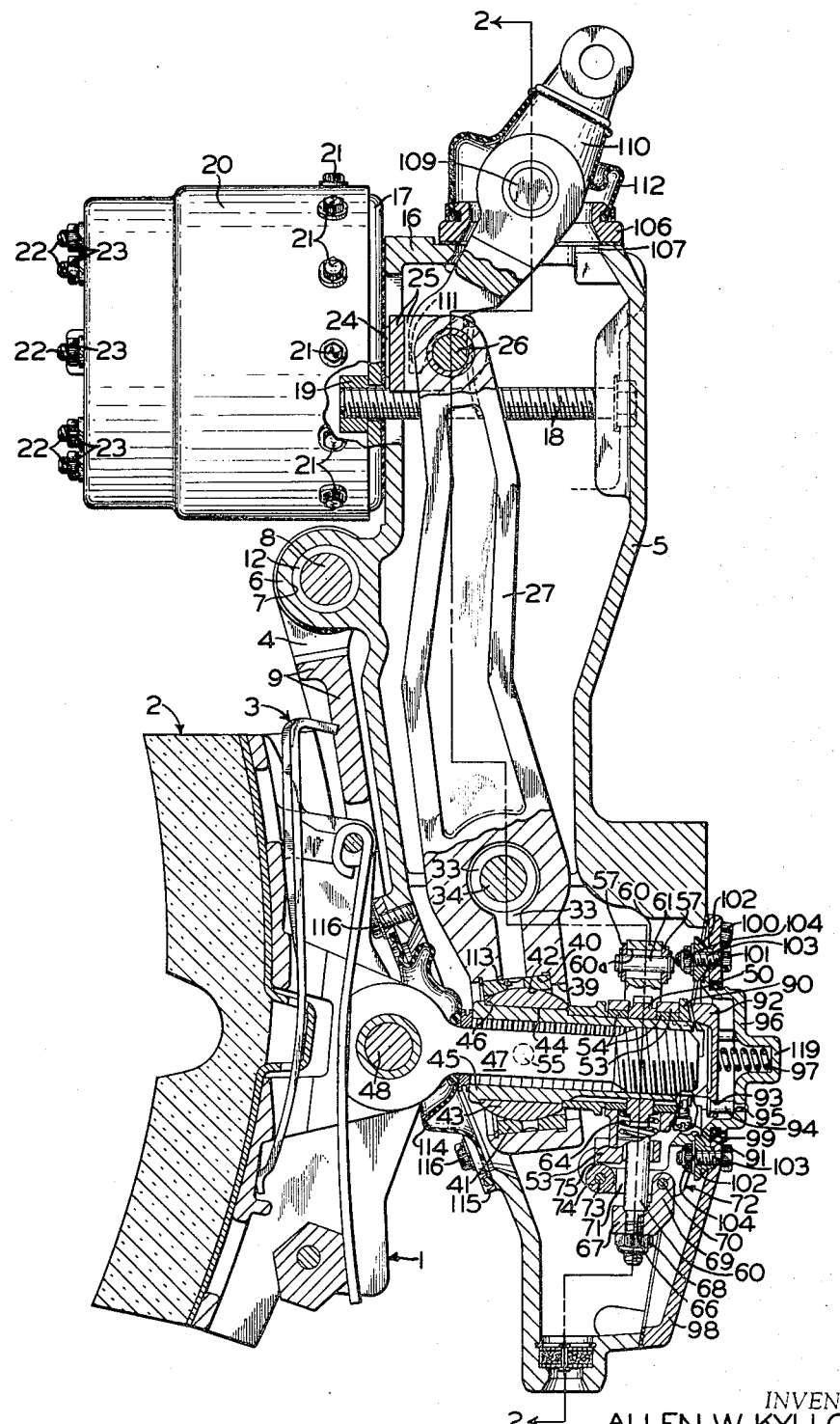
FIG. 1 is a vertical cross-sectional view, taken along the line 1—1 of FIG. 2 and looking in the direction of the arrows, of a brake assembly showing the brake-applying linkage and the upper and lower portions of a slack adjuster mechanism, the center portion being removed to show details of a brake rod and a ratchet wheel of the slack adjuster mechanism carried thereon.
Figure 2:
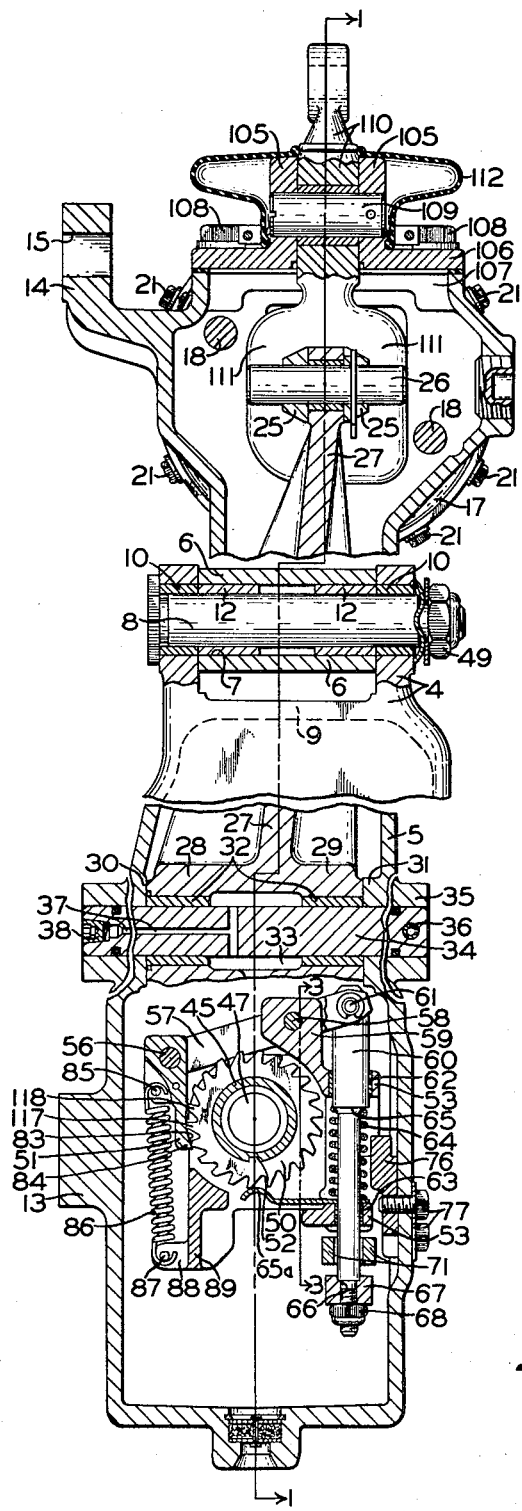
FIG. 2 is a vertical cross-sectional view, taken along the line 2—2 of the brake assembly of FIG. 1 and looking in the direction of the arrows, showing further structural details, certain parts being broken away to illustrate the construction of the upper end of the brake head hanger.

There is shown in FIGS. 1 and 2 of the drawings one of four brake assemblies associated respectively with the four wheels of one of two car trucks of each railway vehicle. Each brake assembly comprises a brake head 1 (FIG. 1) to which a brake shoe 2, preferably of the composition type as shown, is secured in the usual manner by a key 3, an external brake head hanger 4, and a sectionalized casing or support member comprising a main casing section 5 having formed integral therewith a bracket 6 which is provided with a bore 7 through which extends a bolt 8. The brake head hanger 4 comprises two identical parallel links which are integrally connected by a web 9 and suspended from a pair of wear bushings 10 (FIG. 2) carried on the pin 8. This pin 8 extends through a second pair of spaced-apart wear bushings 12 that are disposed between the bushings 10 and within the bore 7 in the bracket 6. As shown in FIG. 2, the left-hand side of the casing section 5 is provided with a boss 13 and an arm 14 that are integral with this casing section. The boss 13 is provided with a plurality of screw-threaded bottomed bores (not shown) and the arm 14 is provided with a smooth bore 15 for receiving respectively a plurality of cap screws (not shown) and a bolt (not shown) for securing the casing section 5 to two angle brackets (not shown) which in turn are secured, as for example, by welding, to a truck frame of a railway passenger car truck.

As shown in FIG. 1, the casing section 5 has formed integral therewith a bracket 16 to which a cup-shaped non-pressure head 17 is secured by a pair of bolts 18 and 19, only one of each of which appears in FIG. 1. This cup-shaped non-pressure head 17 one extends into the right-hand end of a hollow brake cylinder 20 and is secured thereto by a plurality of cap screws 21. The left-hand end of the cylinder 20 is closed by a pressure head (not shown) which is secured thereto by a plurality of bolts 22 and nuts 23.

A brake-applying movable abutment (not shown) within the cylinder 20 has secured thereto the left-hand end of a piston rod 24 that has integral with its right-hand end a clevis 25 that is pivotally connected, as by a pin 26, to the upper end of a brake lever 27.

Formed on the brake lever 27 intermediate its ends are two oppositely arranged and outwardly facing bosses 28 and 29 (FIG. 2) of unequal length. A pair of oppositely arranged and inwardly facing bosses 30 and 31, coaxial with the bosses 28 and 29, are formed on the opposite walls of the main casing section 5, and each of these bosses is provided with a bore coaxial with the bores in the other three bosses. A pair of sleeve-type bearings 32 is press-fitted into the coaxial bores in the bosses 28 and 29, it being noted from FIG. 2 that these bores open into a chamber or cavity 33 located within the lever 27. A pin 34 extends through the bosses 30 and 31, bearings 32, chamber 33 and an outwardly facing boss 35 coaxial with the bosses 30 and 31 and formed on the outside wall of the casing section 5 to permit rocking of the brake lever 27 about this pin 34. The pin 34 is retained in place by a locking pin 36 which extends through coaxial bores in the pin 34 and boss 35.

The cavity or chamber 33 within the lever 27 is open to the exterior of the casing section 5 by way of a passageway 37 in the pin 34, one end of this passageway opening into the chamber 33 and the other opening at the left-hand end of the pin 34. This opening at the left!-hand end of the pin 34 is threaded to receive a threaded plug 38 which may be removed to permit the opening to receive the end of a spout of a grease gun from which the chamber 33 may be filled with a suitable lubricating grease for lubricating certain parts of the brake assembly hereinafter described.

The lever 27 has a bore 39 and a coaxial counterbore 40 (FIG. 1) the axis of which is disposed at a right angle to and beneath the axis of the pin 34. Press-fitted into the counterbore 40 and having one end resting against the shoulder formed at the right-hand end of this counterbore is a two-piece split bushing 41. Each half of the bushing 41 is provided with a cavity 42 in the form of a segment of a sphere, the two cavities cooperating to form a seating surface for a member 43, the outer surface of which constitutes a zone of a sphere.

The member 43 is provided with a bore 44, the axis of which is also disposed at a right angle to and beneath the axis of the pin 34 and, when in the position shown in FIG. 1, at an acute angle to the axis of the bore 39. Disposed in the bore 44 with a light fit is an internally-threaded sleeve member 45 having adjacent its left-hand end, as seen in FIG. 1, a shoulder 46 against which abuts the left-hand end of member 43.

A brake rod 47 threaded at one end, has screw-threaded engagement with the internally-threaded sleeve member 45, and at the other end is pivotally connected to one end of the brake head hanger 4 and the brake head 1 by a bolt 48 and a nut (not shown). The brake head hanger 4 comprises two identical parallel links disposed respectively on the opposite sides of the bracket 6 integral with the main casing section 5, and suspended from this bracket, as by means of the bolt 8, the thread end of which carries a nut 49 to secure it against removal from the position in which it is shown in FIG. 2.

The brake head 1 has embodied therein a cam arrangement for adjusting the angular position of the brake head with respect to the tread surface of the car wheel. This adjusting mechanism is fully described in copending U.S. application Ser. No. 163,960, filed July 19, 1971, of Robert J. Bridigum.

It is apparent from FIG. 1 that, as the braking surface of the brake shoe 2 wears away, the travel of the brake rod 47 in the direction of the left hand will increase upon each successive application of the brakes. Therefore, in order to maintain the same travel distance for the brake rod 47 and also the piston of the brake cylinder 20, upon each subsequent application of the brakes as the brake shoe 2 wears away, the brake assembly is provided with a slack take-up or adjusting mechanism which will now be described in detail.

The slack adjuster mechanism of the brake assembly shown in FIGS. 1 and 2, comprises, in addition to the threaded portion of the brake rod 47 and the internally-threaded sleeve member 45 which has screw-threaded engagement with the threaded portion of the brake rod 47, a ratchet wheel 50, a pawl 51 and a driving mechanism operatively connecting the pawl 51 to the brake lever 27.

The ratchet wheel 50 has formed integral therewith a key 52 which fits into a keyway provided therefor in the sleeve member 45 so that the ratchet wheel 50 is thereby keyed to this sleeve member. The respective opposite sides of the ratchet wheel 50 abut the respective opposite walls of a slot provided therefor in a slack adjuster ring 53 that is mounted on the sleeve member 45 for movement therewith by a pair of sleeve bearings 54 (FIG. 1). The slack adjuster ring 53 is provided with an arm (not shown) having therein a slot in which is disposed a substantially square fulcrum pin bearing (not shown). This fulcrum pin bearing is provided at its center with a bore for receiving therein a boss 55 (FIG. 1) that is integral with the brake lever 27 adjacent its lower end. This fulcrum pin bearing and the boss 55 prevent rotation of the slack adjuster ring 53 and provide for movement of the sleeve member 45 and the brake rod 47 in the direction of the left hand, as viewed in FIG. 1, to bring the braking surface of the brake shoe 2 into braking contact with the tread surface of the car wheel in response to clockwise rocking, as viewed in FIG. 1, of the brake lever 27 in a brake-applying direction.

The pawl 51, as shown in FIG. 2, is pivotally mounted adjacent one end, on a pin 56, which has its opposite ends anchored in a pair of spaced-apart links 57 adjacent the left-hand end thereof, only one of these links appearing in FIG. 2. These spaced-apart links 57 are rockably mounted intermediate their ends on a pin 58 that, as shown in FIG. 2, is carried by an arm 59 which is integral with the slack adjuster ring 53. Adjacent their right-hand end, the two spaced-apart links 57 are operatively connected to an operating stem 60 that has adjacent its upper end a bore 60a through which extends a pin 61, the diameter of which is substantially less than the diameter of the bore 60a, as shown in FIG. 1. The respective opposite ends of the pin 61 are anchored in the links 57 adjacent the right-hand end thereof. Since the diameter of the pin 61 is substantially less than that of the bore 60a in the operating stem 60, a chosen amount of lost motion is provided between the brake lever 27 and the slack adjuster.

As shown in FIG. 2, the diameter of the intermediate portion of the operating stem 60 is less than that of the upper portion and greater than that of the lower portion, it being noted that the lower portion is provided with external screw threads. The upper portion of the stem 60 slidably extends through a wear bushing 62 carried in the slack adjuster ring 53. Likewise, the intermediate portion of the stem 60 slidably extends through a wear bushing 63 that is also carried in the slack adjuster ring 53. As shown in FIG. 2, the links 57 are normally biased in a counterclockwise direction about the pin 58 by a spring 64 that is disposed about the stem 60 and interposed between a shoulder 65 formed on this stem 60 by the upper end of the intermediate portion and a detent 65a that at one end abuts the ratchet wheel 50 and at the other end is provided with a bore through which the stem 60 extends, the spring 64 biasing this end of the detent against that part of the slack adjuster ring 53 that carries the bushing 63.

As shown in FIGS. 1 and 2, the lower threaded end of the operating stem 60 extends through a bore 66 provided in a slack adjuster stem driver 67 and receives thereon a nut 68 which retains the stem driver 67 on the operating stem 60. The stem driver 67, as shown in FIG. 1, has an arm 69 that carries a pin 70. As best shown in FIG. 4, the diameter of one end of the pin 70 is greater than that of the other, it being noted that this pin 70 has its opposite ends anchored in a bifurcated arm 71 of a bell-crank lever 72 which is thereby pivotally mounted on this pin 70. It will be noted from FIG. 4 that the portion of the pin 70 having the larger diameter extends through one bifurcation of the arm 71 and the arm 69 of the stem driver 67, and the portion having the smaller diameter extends through the other bifurcation of the arm 71. It will be further noted from FIGS. 3 and 4 that the bifurcated arm 71 straddles the operating stem 60 and carries a second pin 73, the diameter of one end of which is greater than that of the other. The opposite ends of this pin 73 are likewise anchored in the bifurcated arm 71.

Rotatably mounted on the pin 73 and disposed between the two bifurcations of the arm 71 is a roller 74 which, as shown in FIG. 1, abuts a flat stop surface 75 formed on the slack adjuster ring 53. The line of contact between the roller 74 and this flat surface 75 constitutes a fulcrum for the bell crank lever 72.

Figure 3:
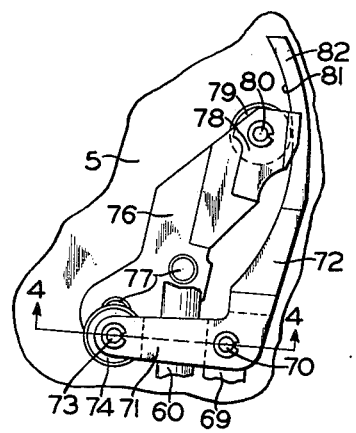
FIG. 3 is a fragmentary elevational view showing certain details of the slack adjuster mechanism not made apparent in FIGS. 1 and 2.
Figure 4:
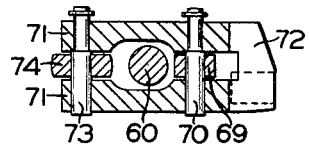
FIG. 4 is a cross-sectional view, taken along the line 4—4 of FIG. 3 and looking in the direction of the arrows, showing further structural details of the slack adjuster mechanism.

As shown in FIGS. 2 and 3 of the drawings, a slack adjuster roller bracket 76 is secured to one inside wall of the casing section 5 by a pair of cap screws 77. As best shown in FIG. 3, the upper end of the roller bracket 76 has a clevis 78 formed integral therewith. Disposed between the jaws of this clevis 76 is a second roller 79 that is rotatably mounted on a pin 80 that has its opposite ends anchored in the jaws of the clevis 78. The roller 79 abuts an arcuate surface 81 formed on the other arm 82 of the bell-crank lever 72 and rolls along this surface as this lever 72 is rocked about the above-mentioned fulcrum constituted by the line of contact between the roller 74 and the flat surface 75 in a manner hereinafter described.

As shown in FIG. 2, the pawl 51 adjacent its lower end is provided with a cam surface 83 and a pawl tip 84. Intermediate its ends the pawl 51 carries a pin 85 to receive a hook formed at one end of a tension spring 86. The other end of this spring 86 is also provided with a hook that serves to anchor this end of the spring to a pin 87 that has its opposite ends anchored in the jaws of a clevis 88 that extends outward from a vertically disposed arm 89 that is integral with the hereinbefore-mentioned slack adjuster ring 53. The spring 86 is effective to normally bias the members of the slack adjuster mechanism to the position shown in the drawings in which the cam surface 83 on the pawl 51 abuts three teeth on the ratchet wheel 50.

In order to provide for manually rotating the sleeve 45 relative to the brake rod 47 to let out slack prior to replacing a worn brake shoe, the brake assembly constituting the present invention embodies therein a manual adjusting mechanism which will now be described.

The right-hand end of the sleeve member 45 is provided with external screw threads that have screw-threaded engagement with internal screw threads provided in a slack adjuster lock nut 90. This lock nut 90 is provided with three arcuately-spaced screw-threaded bores, only one being shown in FIG. 1, for receiving a like number of locking pins 91 which serve to lock this lock nut 90 to the sleeve member 45. The lock nut 90 is provided with three arcuately-spaced square-type jaws for engagement by a like number of arcuately-spaced square-type jaws formed on a drive ring 92. This drive ring is provided with three arcuately-spaced bores 93. Coaxial with each bore 93 is a coaxial counterbore for receiving the cylindrical head formed at one end of a pin 94. The other end of each pin 94 is less in diameter than the portion thereof adjacent the head and extends through a bore 95 provided therefor in the bottom of a cup-shaped wrench-receiving member 96 between which and the drive ring 92 is interposed a spring 97. The smaller end of each pin 94 is peened over by means of a hammer after the drive ring 92, wrench-receiving member 96, spring 97 and these pins are assembled. This assembly is then inserted through an opening provided therefor in a back cover member 98, there being an O-ring 99 disposed in this opening to prevent the entrance of dust and dirt to the interior of the casing section 5. The back cover member 98 is then secured to the casing section 5 by a plurality of cap screws 100, one of which appears in FIG. 1.

As shown in FIG. 1, the wrench-receiving member 96 is provided with an outturned flange 101 that is normally biased against the back cover member 98 by the spring 97 to thereby limit movement of the member 96 in the direction of the right hand. Movement of the wrench-receiving member 96 in the direction of the left hand is limited by the outturned flange 101 striking a pair of annular retainer members 102, each of which is carried on a bolt 103 that extends through a smooth bore in the back cover member 98 and retained thereon by a nut 104 having screw-threaded engagement with the threaded end of the respective bolt.

In order to provide, in customary fashion, for operation of the brakes by hand brake means, a pair of parallel spaced-apart lugs 105 (FIG. 2) are formed integral with a top cover 106 that closes an opening 107 in the upper end of casing section 5 and is secured thereto by a plurality of cap screws 108, two of which appear in FIG. 2. Disposed between these lugs 105 and pivotally connected thereto intermediate its ends, as by a pin 109 that has its opposite ends anchored in these lugs 105, is a hand brake lever 110. The lower end of this lever 110 is bifurcated to form two fingers 111 which are disposed on the opposite sides of the jaws of the clevis 25. The fingers 111 are adapted to contact the opposite ends of the pin 26 which extend beyond the jaws of the clevis 25 to permit the hand brake lever 110 to be operatively connected to the power brake lever 27. The upper end of the hand brake lever 110 may be connected through a cable and a system of pulleys (not shown) to the hand brake wheel which is located at one end of a railway car. A rubber boot 112 surrounds the lever 110 and the lugs 105 to prevent the entrance of foreign matter into the interior of the casing section 5 through the opening formed between the lugs 105.

In order to provide for lubrication of the member 43 (FIG. 1), a drilled port 113 opens from the bottom of the chamber 33 through the upper portion of the two-piece split bushing 41 onto the spherical surface of the member 43. The upper end of the port 113 may be enlarged to receive a piece of felt, wicking or other suitable oil absorbing material which acts to prevent a rapid flow of lubricant from the chamber 33 to the spherical surface of the member 43 yet permits a sufficient flow to meet normal lubricational requirements of the member 43.

As shown in FIG. 1, the left-hand end of the brake rod 47 extends through a suitable opening in the left-hand wall of the casing section 5 to the exterior thereof. In order to prevent the entrance of water, ice and dirt to the interior of casing section 5, a rubber boot 114 surrounds the opening in the casing section 5. This boot is provided with a bead which fits around the brake rod 47 to form a seal therewith. The outer periphery of the boot 114 is clamped between the casing section 5 and an annular retaining member 115 which is secured to the casing section 5 by a plurality of cap screws 116, two of which appear in FIG. 1.

OPERATION

In operation, when it is desired to effect a brake application, fluid under pressure is supplied to the pressure chamber (not shown) of the brake cylinder 20 by operation of the brake control valve of the usual air brake system on railway passenger cars. This fluid under pressure is effective to move the piston (not shown) and piston rod 24 (FIG. 1) in the direction of the right hand against the yielding resistance of a brake cylinder release spring (not shown). As the piston and piston rod 24 are moved in the direction of the right hand, the brake lever 27 is rocked clockwise, via the bearings 32 (FIG. 2), on the pin 34. Since the brake lever 27 is pivotally connected to the brake rod 47 by means of the ball or universal joint formed by the two-piece split bushing 41 and the member 43, clockwise rocking of brake lever 27 is effective to move the brake rod 47 in the direction of the left hand to bring the brake shoe 2 carried by the brake head 1 into braking contact with the tread surface of a wheel (not shown) to effect a braking action on the wheel.

As the brake head 1 and brake shoe 2 are moved as described above, these members are supported and guided by the hanger 4 as this hanger is rocked about the bolt 8 carried by the bushings 12 in the bracket 6. The orientation of the hanger 4, the brake head 1 and the brake rod 47 is such that the brake head 1 and brake shoe 2 carried thereby are moved substantially radially toward the car wheel.

When it is desired to release the brake application, the fluid under pressure supplied to the pressure chamber of the brake cylinder 20 is vented in the usual manner to atmosphere via the brake control valve of the car brake system, whereupon the force of the brake cylinder release spring acting on the non-pressure head 17 moves the piston and piston rod 24 in a brake-releasing direction to effect counterclockwise rocking of brake lever 27 and movement of the brake head 1 and brake shoe 2 away from the tread surface of the wheel to effect a brake release.

In operation, at the same time as the brake lever 27 is rocked in a clockwise direction, as viewed in FIG. 1, in order to effect an application of the brakes, the slack adjuster ring 53, ratchet wheel 50, pawl 51, links 57, operating stem 60 and stem driver 67 having arm 69 are moved in the direction of the left hand simultaneously as the brake rod 47 and sleeve member 43 are moved in this direction. As shown in FIG. 3, the roller 79 abuts the arcuate surface 81 of the arm 82 of the bell crank lever 72 and this roller is mounted on the pin 80 which is carried by the clevis 78 of bracket 76 that is rigidly secured to the casing section 5. Consequently, the roller 79 and pin 80 are immovable with respect to the casing section 5. Therefore, the roller 79 restrains movement of the arm 82 in the direction of the left hand, as viewed in FIG. 3. Moreover, the roller 74 abuts the flat surface 75 (FIG. 1) which is formed on the slack adjuster ring 53 which is being moved in the direction of the left hand at this time. Accordingly, the roller 79 causes the bell crank lever 72 to be rocked clockwise, as viewed in FIGS. 1 and 3, about the line of contact between the roller 74 and surface 75 on the slack adjuster ring 53 as this roller 79 rolls along the arcuate surface 81 on the arm 82 in response to the movement of the slack adjuster ring 53, ratchet wheel 50, pawl 51, links 57, operating stem 60 and stem driver 67 having arm 69 in the direction of the left hand. Since the bell crank lever 72 is operatively connected to the arm 69 by the pin 70, this clockwise rocking of the bell crank lever is effective to move this arm 69 and the stem driver 67 integral therewith downward.

It can be seen from FIG. 2 that downward movement of the stem driver 67 is effective via the nut 68 to exert a pull in a downward direction on the operating stem 60 which is effective via the pin 61, after taking up the lost motion provided by the difference in the diameter of the pin 61 and the bore 60a, to effect clockwise rocking, as viewed in FIG. 2, of the two links 57 about the pin 58. Since the pin 56 on which the pawl 51 is pivotally mounted has its opposite ends anchored in the links 57, the above-described clockwise rocking of these links 57 is effective to move the pawl 51 in an upward direction, as viewed in FIG. 2, so that the cam surface 83 on the pawl 51 slides upward on the teeth of the ratchet wheel 50, which ratchet wheel is not rotated under these conditions by reason of the fact that it is keyed by means of the key 52 integral therewith to the sleeve member 45 which is carried by the two-piece split bushing 41 that at this time is being moved in the direction of the left hand, as viewed in FIG. 1, by the brake lever 27. If the brake shoe wear does not exceed a predetermined amount, the cam surface 83 and pawl tip 84 will not be moved upward a sufficient distance for the pawl tip 84 to pass above a tooth 117 and drop into the space between this tooth 117 and the adjacent tooth 118. Consequently, when the brakes are subsequently released under these conditions, the pawl 51 is returned to its original position by the tension spring 86 without effecting rotation of the ratchet wheel 50 since this spring 86 is effective to bias the pawl 51 in a counterclockwise direction about the pin 56 to maintain the cam surface 83 in contact with the end of the teeth along which it slides during a brake application.

If, however, during a brake application, the brake shoe 2 (FIG. 1) wears away sufficiently for the pawl tip 84 to be moved upward until it passes over or above the outer end of the tooth 117 on the ratchet wheel 50, it will drop into the space between the teeth 117 and 118. With the pawl tip 84 in this position, the pawl 51 will be effective to rotate the ratchet wheel 50 and sleeve member 45 upon a subsequent brake release. Rotation of brake rod 47 is prevented by its connection to the brake head 1 and hanger 4. Consequently, the screw-threaded sleeve member 45 is unscrewed from the screw-threaded portion of the brake rod 47, thus moving the brake shoe 2 in the direction of the wheel and taking up the slack occurring as a result of the wearing away of the brake shoe 2.

From the above, it is apparent that as the brake shoe 2 wears away, the brake rod 47, and consequently the brake shoe 2, are moved substantially radially and at a slight angle to the horizontal in the direction of the wheel to always maintain a substantially uniform clearance between the tread of the wheel and the braking surface of the brake shoe 2 when this brake shoe occupies its brake release position.

When the brake shoe 2 has completely worn out and it is to be replaced with a new shoe, it is necessary to reduce the length of the brake rod 47 since the thickness of the new brake shoe is greater than that of the worn shoe. The length of the brake rod 47 may be reduced by first applying a wrench to a hexagon or square head 119 formed on the wrench-receiving member 96 and manually rotating the wrench clockwise, assuming that the workman is standing in the back of or on the right-hand side of the brake assembly, as shown in FIG. 1.

The wrench-receiving member 96 is connected to the drive ring 92 by the three headed pins 94 and has three arcuately-spaced square-type jaws which engage a like number of jaws on the slack adjuster lock nut 90 that is locked to the sleeve member 45 by three locking pins 91. Consequently, manual rotation of the wrench in a clockwise direction effects rotation of the sleeve member 45 relative to the brake rod 47 to reduce the length of this brake rod 47 the required amount.

It should be noted that, as heretofore well known in slack adjuster mechanisms, the pawl 51 and its cam surface 83 are of such shape and size that, incidental to a brake release, this cam surface, which is in contact with the ends of certain of the teeth on the ratchet wheel 50 (FIG. 2), is effective, as the pawl 51 continues its downward movement to its release position and prior to reaching its normal or release position corresponding to the brake release position of the brake shoe 2, to so limit the counterclockwise rocking of the pawl 51 about the pin 56, as viewed in FIG. 2, such that, upon the pawl reaching its release position, the pawl tip 84 will have been moved to a position in which the ratchet wheel is free to rotate in a clockwise direction when the sleeve member 45 and slack adjuster lock nut 90 are manually rotated in a clockwise direction by a wrench applied to the hexagon or square head 119 of the wrench-receiving member 96.

Having now described the invention, what I claim as new and desire to secure by Letters Patent, is:

1. A slack adjuster mechanism for a wheel tread brake assembly having a brake lever operatively connected through a rotative internally-threaded sleeve member and a non-rotative screw member to a brake-shoe-carrying brake head via which a brake-applying force is transmitted to the wheel, said mechanism comprising:
   a. a ratchet wheel mounted on said sleeve member for rotation therewith,
   b. a pawl member for effecting rotational movement of said ratchet wheel, wherein the improvement comprises:
   c. a slack adjuster ring having said sleeve member rotatably mounted therein and so operatively connected to said brake lever as to be non-rotatably movable therewith,
   d. a link pivotally mounted intermediate its ends on said slack adjuster ring and having said pawl member pivotally mounted thereon adjacent one end thereof,
   e. a bell-crank lever pivoted at one end on said slack adjuster ring and connected intermediate its ends to the other end of said link, and
   f. means effective upon movement of said slack adjuster ring by said brake lever to cause rocking of said bell-crank lever whereby rocking of said bell-crank lever in one direction subsequent to the rocking thereof in an opposite direction through an angle greater than a chosen angle as a result of wear of rotational movement of said ratchet wheel and thereby said sleeve member with respect to said non-rotative screw member to increase the effective length of said screw member to move said brake-shoe-carrying brake head toward said wheel.

2. A slack adjuster mechanism, as claimed in claim 1, further characterized in that said bell-crank lever carries at said one end a roller that abuts said slack adjuster ring, the line of contact between said roller and said ring constituting a fulcrum for said bell-crank lever.

3. A slack adjuster mechanism, as claimed in claim 1, further characterized in that said bell-crank lever comprises two arms, one of which is bifurcated and carries a roller that abuts said slack adjuster ring, the line of contact between said roller and said ring constituting a fulcrum for said bell-crank lever, and the other of which is provided with an arcuate surface, and a roller is rotatably mounted on a stationary pin so as to roll along said arcuate surface on said other arm to effect rocking of said bell-crank lever about said fulcrum upon rocking of said brake lever.

4. A slack adjuster mechanism, as claimed in claim 1, further characterized by means connecting the other end of said link to said bell-crank lever comprising:
   a. an operating stem, one end of which has a lost-motion connection with the other end of said link, and
   b. a driving member carried on the other end of said operating stem and having an arm upon which said bell-crank lever is pivotally mounted intermediate its ends.

5. A slack adjuster mechanism, as claimed in claim 3, further characterized by a removable bracket having a clevis in the jaws of which are anchored the opposite ends of said stationary pin.

6. A slack adjuster mechanism, as claimed in claim 4, further characterized in that said bell-crank lever comprises two arms, one of which is bifurcated and carries a roller that abuts said slack adjuster ring, the line of contact between said roller and said ring constituting a fulcrum for said bell-crank lever, and said operating stem extends through the bifurcation of said one end, said driving member being disposed on one side of said bifurcation and said lost motion connection being disposed on the other side.

7. A slack adjuster mechanism for a wheel tread brake unit having a brake lever operatively connected through a rotative internally-threaded sleeve member provided at one end with external screw threads and a non-rotative screw member to a brake-shoe-carrying brake head through which a brake-applying force is transmitted to the wheel, wherein the improvement comprises:
   a. a slack adjuster lock nut having internal screw threads for screw-threaded engagement with said external screw threads on said sleeve member and a plurality of arcuately-spaced clutch jaws,
   b. a manually rotative drive ring having a plurality of arcuately-spaced clutch jaws for clutching contact with said clutch jaws on said slack adjuster lock nut, and
   c. biasing means for effecting engagement of said jaws on said drive ring with said jaws on said slack adjuster lock nut whereby rotation of said drive ring effects rotation of said sleeve member with respect to said non-rotative screw member to decrease the effective length of said screw member to move said brake-shoe-carrying brake head away from said wheel.

8. A slack adjuster mechanism, as claimed in claim 7, further characterized by a tool-receiving member having a driving connection with said drive ring.

9. A slack adjuster mechanism, as claimed in claim 8, further characterized in that said biasing means is interposed between said tool-receiving member and said drive ring for urging said clutch jaws on said drive ring in the direction of said clutch jaws on said slack adjuster lock nut.

10. A slack adjuster mechanism, as claimed in claim 8, further characterized by means for limiting movement of said tool-receiving member toward and away from said drive ring.

* * * * *